United States Patent
Xi

(10) Patent No.: US 7,005,813 B2
(45) Date of Patent: Feb. 28, 2006

(54) BOOSTER CIRCUIT FOR A PRE-DRIVE CIRCUIT OF A BRUSHLESS DIRECT CURRENT SINGLE-PHASE MOTOR

(75) Inventor: Junnan Xi, Miyota-Machi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/719,010

(22) Filed: Nov. 24, 2003

(65) Prior Publication Data

US 2004/0150358 A1    Aug. 5, 2004

(30) Foreign Application Priority Data

Nov. 26, 2002  (JP) ............................. 2002-342179

(51) Int. Cl.
- *H02P 1/02*    (2006.01)
- *H02P 1/18*    (2006.01)
- *G05F 1/10*    (2006.01)
- *H02M 3/24*    (2006.01)

(52) U.S. Cl. ...................... 318/254; 318/439; 318/138; 318/293; 323/222; 363/98; 363/58

(58) Field of Classification Search .............. 318/254, 318/439, 138, 663, 674, 293, 295; 388/907.2; 323/365, 282, 222, 284, 231; 363/98, 58, 363/50, 74

See application file for complete search history.

(56) References Cited

U.S. PATENT DOCUMENTS

| | | | | |
|---|---|---|---|---|
| 4,456,856 A | * | 6/1984 | Klinger ........................ | 315/408 |
| 4,733,159 A | * | 3/1988 | Edwards et al. ............ | 323/282 |
| 5,442,260 A | * | 8/1995 | Saito et al. ............... | 315/241 P |
| 5,519,306 A | * | 5/1996 | Itoh et al. .................... | 323/222 |
| 5,737,144 A | * | 4/1998 | Ataee et al. ................ | 318/254 |
| 5,874,826 A | * | 2/1999 | Chen et al. .................. | 323/222 |
| 6,060,859 A | * | 5/2000 | Jonokuchi .................... | 318/801 |
| 6,232,752 B1 | * | 5/2001 | Bissell ........................ | 323/222 |
| 6,331,365 B1 | * | 12/2001 | King ............................ | 320/103 |
| 6,611,127 B1 | * | 8/2003 | Arimitsu et al. ............ | 318/254 |
| 2003/0205974 A1 | * | 11/2003 | Kuehner et al. ............ | 318/254 |
| 2004/0047167 A1 | * | 3/2004 | Prasad et al. ............... | 363/125 |
| 2004/0070862 A1 | * | 4/2004 | Ranmuthu .................... | 360/68 |

FOREIGN PATENT DOCUMENTS

| | | | | |
|---|---|---|---|---|
| GB | 2273212 A | * | 6/1994 | |
| JP | 05083987 A | * | 4/1993 | |
| JP | 2003244966 A | * | 8/2003 | |

* cited by examiner

*Primary Examiner*—Edgardo San Martin
(74) *Attorney, Agent, or Firm*—Adduci, Mastriani & Schaumberg, L.L.P.

(57) ABSTRACT

A booster circuit for a pre-drive circuit of a brushless direct current single-phase motor. When a series pair of power FETs of the drive circuit turn on, one boost control switching element of the pre-drive circuit turns on, another series pair of power FETs of the drive circuit turn off, and the other boost control switching element of the pre-drive circuit turns off. The booster circuit provides a continuous stable output voltage to the motor.

16 Claims, 6 Drawing Sheets

BOOSTER CIRCUIT FOR A PRE-DRIVE CIRCUIT OF A BRUSHLESS DIRECT CURRENT SINGLE-PHASE MOTOR

CROSS REFERENCE TO RELATED APPLICATION

The present application is related to, and claims priority from, Japanese patent application no. 2002-342179, filed on Nov. 26, 2002, the contents of which are incorporated herein by reference.

BACKGROUND

The present invention relates to a booster circuit for a pre-drive circuit of a brushless direct current single-phase motor. The brushless direct current single-phase motor is ideal as a fan motor that exhausts heat generated within the housing of an electronic instrument to the exterior.

In a conventional electronic instrument, a plurality of electronic components are accommodated in a relatively narrow housing as office automation equipment, such as personal computers and copiers. The heat generated from the electronic components is confined within the housing and there is a danger of thermal breakdown of the electronic components.

Therefore, vent holes are provided in the walls, for example, of the housings of such electronic components. An air blower (fan motor) is attached near the vent holes to exhaust heat from inside the housing to the exterior.

It is not uncommon for brushless direct current single-phase motors to be used for this type of fan motor. The drive circuit of this type of brushless direct current single-phase motor will be explained in reference to FIG. 4.

In FIG. 4, the drive circuit 31 is configured with four main switching elements, which are N-channel MOS-type power FET (field effect transistors) PF1 to PF4, and a diode D31.

The four power field effect transistors (FETs) PF1 to PF4 (hereinafter PF1, PF2, PF3 and PF4) are divided into two pairs of serially connected power FETs or, in other words, a series connection resulting from PF1 and PF3 and a series connection resulting from PF2 and PF4. They are respectively connected between the power supply +B and ground and have polarities as shown in the drawing. Diode D31 is connected in the forward direction with respect to the power supply +B between the power supply +B and the two pairs of serially connected power FETs (PF1, PF3, PF2, PF4). The coil (motor coil) L1 that is subject to driving is connected between the junction of PF1 and PF3 and the junction of PF2 and PF4.

The pre-drive circuit 32 is a circuit that receives signals from the motor rotation position detector 33 and the duty ratio setting instrument 34 in pulse width modulation (PWM). The pre-drive circuit 32 also supplies gate signals GS1 to GS4 to PF1 to PF4 according to the appropriately set duty ratio. The pre-drive circuit 32 performs ON/OFF control of the power FETs PF1 to PF4.

The coil L1 is provided on the motor stator (not shown in the drawing), and connected as shown. Current flows from the left end in the drawing to the right end or from the right end to the left end at the prescribed ON/OFF timing according to PF1 to PF4. Thus, a dynamic magnetic field (rotating magnetic field) is created.

A permanent magnet is provided on the motor rotor (not shown in the drawing). The rotor rotates by means of the permanent magnet following the dynamic magnetic field.

The pre-drive circuit 32 is equipped with gate circuit portions 32a to 32d that individually output gate signals GS1 to GS4. In this case, power supply +Vp, resulting from direct current power supply +B being boosted by a booster circuit 35 is provided to the gate circuit portions 32a, 32b that output gate signals GS1 and GS2 to PF1 and PF2. Power supply +Vp is provided to the gate circuit portions 32c, 32d that output gate signals GS3 and GS4 to PF3 and PF4 without direct current power supply +B being boosted.

This is such that PF3 and PF4 turn ON if the gate (control input terminal) is slightly higher than the ground potential since the source is grounded. On the other hand, PF1 and PF2 are at the power supply +B side flanking coil L1. For this reason, in the normal case in which the drive voltage of the coil L1 is nearly equal to power supply voltage +B [V], PF1 and PF2 cannot be turned ON. This occurs if the power supply +Vp [V] resulting from adding the voltage between the gate and the source required for turning PF1 and PF2 ON to a voltage greater than the power supply voltage, specifically to the power supply voltage +B [V], is not provided to the gate.

By using the booster circuit 35, it is possible to boost the voltage +B [V] of the direct current power supply +B to the prescribed voltage +Vp [V]. The prescribed voltage +Vp can be provided to the gate circuit portions 32a, 32b. The levels of the gate signals GS1 and GS2 of PF1 and PF2 can be changed to a voltage that is higher than that of gate signals GS3 and GS4 of PF3 and PF4. In addition, PF1 and PF2 ON/OFF control become possible.

FIG. 5 shows the configuration of a conventional booster circuit along with the drive circuit 31 in FIG. 4.

As shown in FIG. 5, the booster circuit consists of a charge pump circuit that is equipped with diodes D41, D42, capacitors C41, C42 and resistors R41, R42 having polarities as in the drawing.

In the drawing, +Vp1 becomes the power supply to gate circuit portion 32a of the pre-drive circuit 32 shown in FIG. 4, and +Vp2 becomes the power supply to gate circuit portion 32b of the same pre-drive circuit 32.

FIG. 6(a) is a voltage waveform drawing of power supply +Vp1 in FIG. 5, in other words, of gate signal GS1. FIG. 6(b) is a voltage waveform drawing of gate signal GS4.

The voltage waveforms of the power supply +Vp2 (gate signal GS2) and gate signal GS3 are also the same as the FIGS. 6(a) and 6(b), with the exception of the phases being different. Note that FIGS. 6(a) and 6(b) give examples of the case in which the duty ratio is 100%.

Through this type of booster circuit, it becomes possible to change the level of gate signal GS1 (GS2) to a voltage that is higher than that of gate signal GS4 (GS3), and ON/OFF control of PF1 (PF2) becomes possible.

However, in the above conventional circuit, the power supply +Vp1 (+Vp2) is generated by capacitor C41 and resistor R41 (capacitor C42 and resistor R42), and gate signal GS1 is created using this power supply +Vp1. For this reason, the voltage waveform of gate signal GS1 is such that rounding occurred during rise or fall compared to the squares shown by the dashed line in FIG. 6(a), and operation of the motor became extremely unstable.

Therefore, one solution is to have booster circuits that use integrated circuits (ICs), transformers and other elements to obtain a stable high voltage and to operate the motor stably. However, these booster circuits had problems in that the transformers and the ICs, in particular, are expensive. Also, the space occupied by the transformer is large and packaging to a small printed wiring board that is built into the motor is difficult.

SUMMARY OF THE INVENTION

In view of the above, a booster circuit for a pre-drive circuit of a brushless direct current single-phase motor is provided that can be easily packaged into a compact and small printed wiring board that is low in cost, and that is able to stably operate the motor.

The booster circuit for a pre-drive circuit may be equipped with a first and second boost control switching elements, a first and second capacitor, and first and second diodes. The first boost control switching element turns ON when a first end side of a motor coil reaches a higher electric potential than another end side and charges a first capacitor from a direct current power supply via a first diode. The second boost control switching element turns ON when the another end side of the motor coil reaches a higher electric potential than the first end side and conducts electricity between the terminal on the side of the connection between the first boost control switching element and the first capacitor and the direct current power supply. This increases the electric potential at the side of the junction of the first capacitor and the first diode.

The second capacitor receives an electric charge and is charged from the first capacitor via a second diode when the second boost control switching element is ON and is connected between the second diode and the switch terminal of the direct current power supply connection side of the second boost control switching element.

Boost voltage output is obtained from the connection path between the second diode and the second capacitor.

Parallel circuits of a diode and a resistor are respectively inserted and connected between the first end side of the motor coil and a control terminal of the first boost control switching element and between the another end side of the motor coil and a control terminal of the second boost control switching element, wherein the diode faces the forward direction with respect to the control terminals of the respective boost control switching elements.

Voltage restricting elements are connected between respective control terminals of the first and second boost control switching elements and a ground side switch terminal.

A filter circuit is inserted into the boost voltage output path from the connection path between the second diode and the second capacitor.

The booster circuit for a pre-drive circuit of the present invention provides stable operation of a brushless direct current single-phase motor.

BRIEF DESCRIPTION OF THE DRAWINGS

The accompanying figures, in which like reference numerals refer to identical or functionally similar elements and which together with the detailed description below are incorporated in and form part of the specification, serve to further illustrate preferred embodiments and to explain various principles and advantages all in accordance with the present invention.

DETAILED DESCRIPTION OF THE PREFERRED EMBODIMENTS

Figure 1:
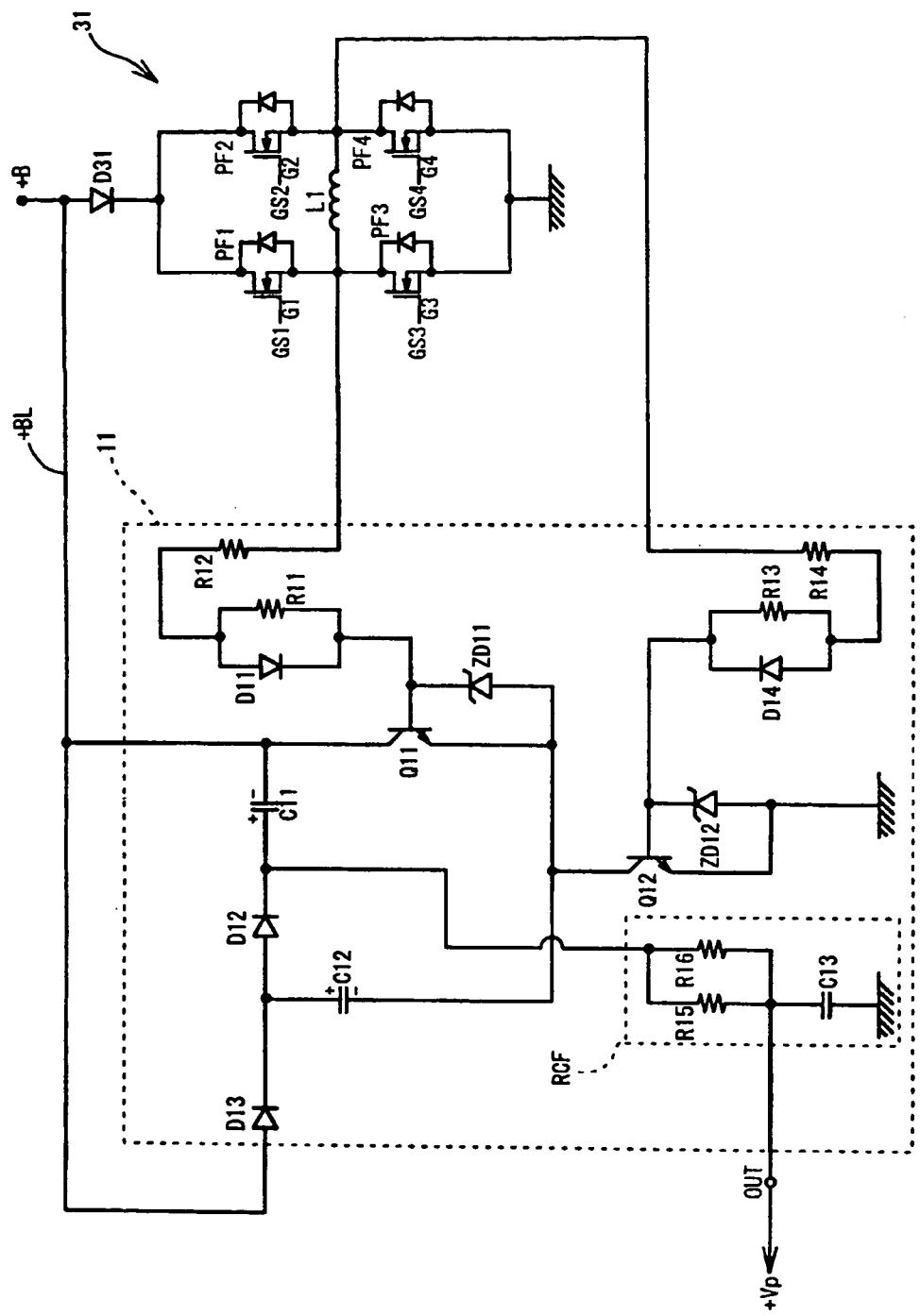
FIG. 1 is a circuit diagram according to a first embodiment of the present invention.
Figure 4:
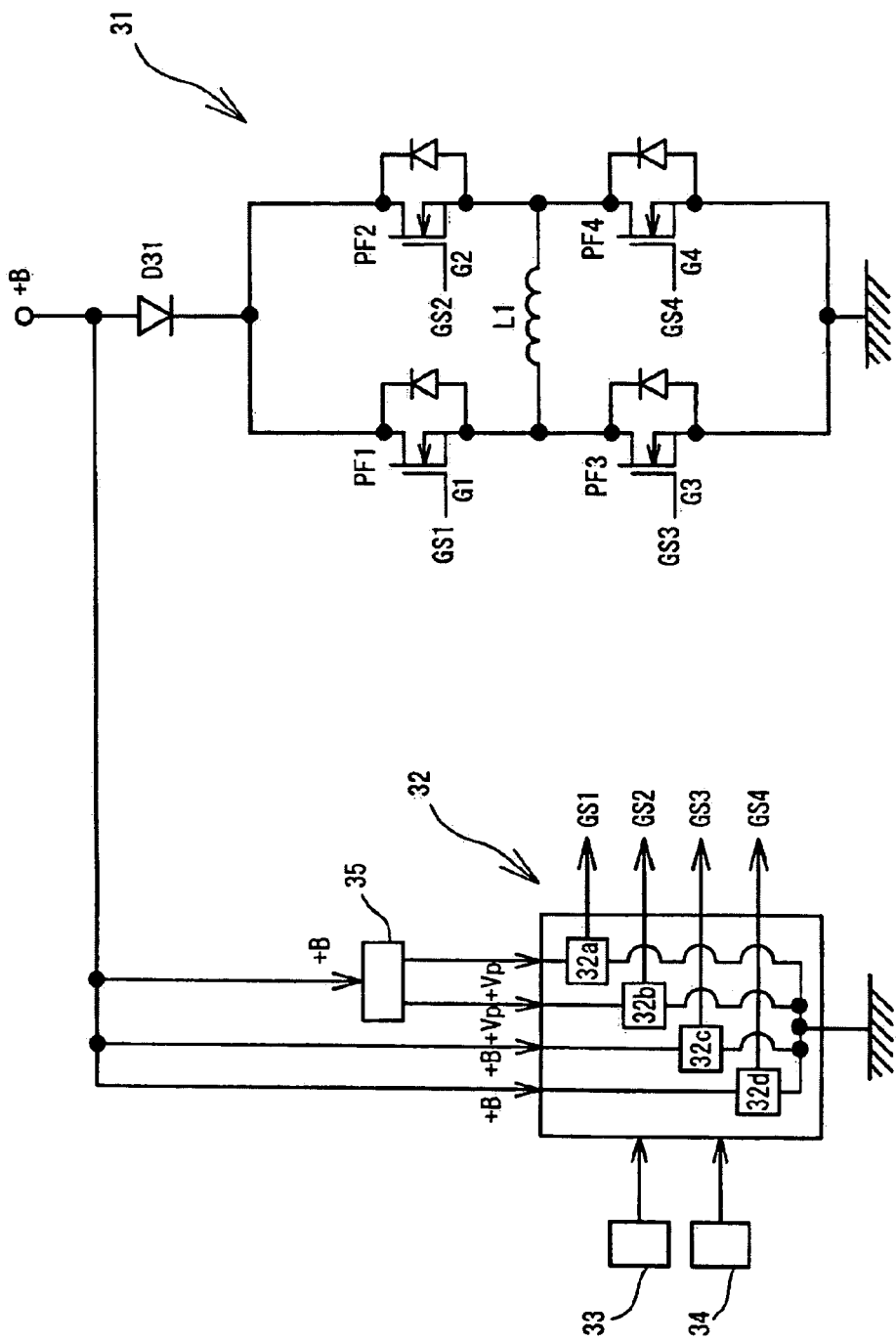
FIG. 4 is circuit diagram illustrating a conventional pre-drive circuit of a brushless direct current single-phase motor.
Figure 5:
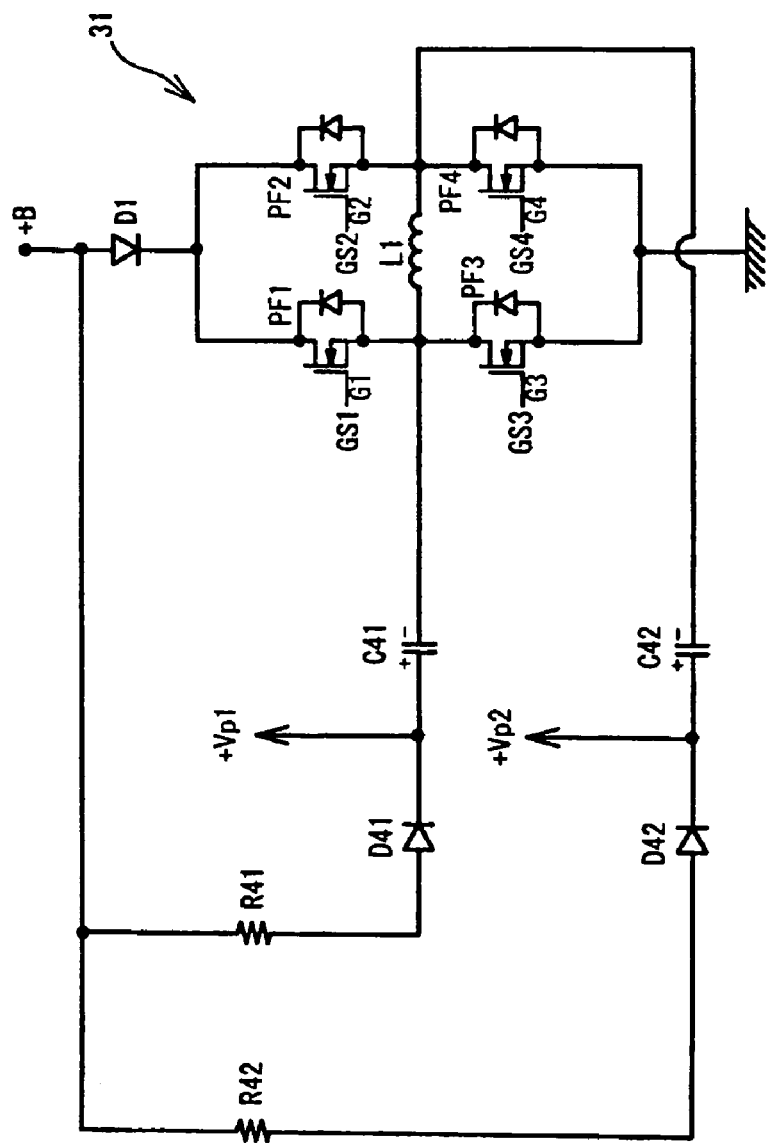
FIG. 5 is a circuit diagram of a conventional booster circuit and the drive circuit of FIG. 4.
Figure 6A:
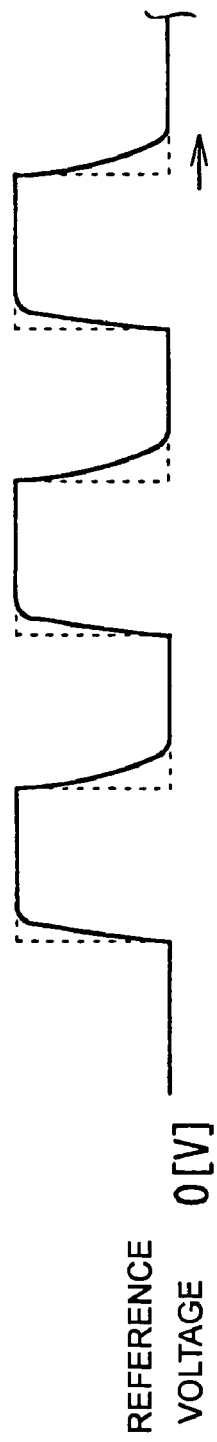
FIG. 6(a) is a waveform diagram illustrating the gate signal GS1 of the circuit of FIG. 5.
Figure 6B:
FIG. 6(b) is a waveform diagram illustrating the gate signal GS4 of the circuit of FIG. 5.

FIG. 1 is a circuit diagram according to a first embodiment of the present invention. Throughout this description, components identical to or like in structure and function to those in FIG. 4 are identified by like reference numbers. Further explanation of these like components has therefore been omitted.

In FIG. 1, a portion 11 that excludes the coil (motor coil) L1 of the brushless direct current single-phase motor and the drive circuit 31 thereof is the booster circuit for the pre-drive circuit of the present invention. The direct current power supply for circuit operation is indicated by +B.

Specifically, the booster circuit 11 for a pre-drive circuit of the present invention consists of a charge pump circuit. The charge pump circuit is configured with two NPN-type transistors (boost control switching elements) Q11, Q12, three capacitors C11 to C13, four diodes D11 to D14, two Zener diodes ZD11, ZD12 and six resistors R11 to R16.

In this case, transistor Q11 is such that the base (control element) is connected at the junction of the coil L1 and PF1 and PF3 of the drive circuit 31 via the parallel circuit consisting of diode D11 and resistor R11, and resistor R12 in that order. In addition, the diode D11 faces the forward direction with respect to the polarity between the base and emitter of transistor Q11.

In addition, a Zener diode ZD11 is connected between the base and emitter of transistor Q11. The Zener diode ZD11 has a polarity opposite than the polarity between the base and emitter of transistor Q11.

Moreover, in addition to the collector (power supply side switch terminal) of transistor Q11 being directly connected to +B power supply line +BL, the collector is also connected to +B power supply line +BL via capacitor C11, diode D12 and diode D13 in that order. As shown in FIG. 1, diode D13, diode D12 and capacitor C11 are connected so that they face forward with respect to the polarity between the collector and emitter of transistor Q11.

In addition, the positive electrode of a capacitor C12 is connected between the junction of diodes D13 and D12 and the emitter of transistor Q11.

In addition, a capacitor C12 is connected between the junction of diodes D13 and D12 and the emitter of transistor Q11 with the positive electrode of capacitor C12 connected to the junction of diodes D13 and D12.

In addition, a Zener diode ZD12 is connected between the base and emitter of transistor Q12. The Zener diode ZD12 has a polarity opposite to the polarity between the base and emitter of transistor Q12.

Moreover, the collector (power supply side switch terminal) of transistor Q12 is directly connected to the emitter (the negative pole of the capacitor C12) of transistor Q11.

The output voltage, specifically boost voltage +Vp [V], of this type of booster circuit 11 is conducted to the output end OUT from the junction of the diode D12 and capacitor C11 via a filter RCF. The filter RCF here is configured by the junction of the diode D12 and capacitor C11, the parallel circuit of resistors R15 and R16 inserted between this junction, and the output end OUT, and the capacitor C13 connected between the junction of the output end OUT side of this parallel circuit and the ground.

The operation of the booster circuit will be explained next.

When PF1 and PF4 turn OFF, PF2 and PF3 turn ON, transistor Q11 turns OFF, and transistor Q12 turns ON (conduction between the collector and emitter). When transistor Q12 turns ON, the current from the +B power supply passes through diode D13 to charge capacitor C12. The voltage between both ends of capacitor C12 at this time is nearly the +B power supply voltage, which can be considered Vp1 [V]. Note that, at this time, the electric potential of the negative pole side of capacitor C12 is the ground electric potential (approximately 0V), since the resistance between the collector and the emitter of transistor Q12 is extremely small.

Next, when PF1 and PF4 turn ON, PF2 and PF3 turn OFF, transistor Q11 turns ON (conduction between the collector and emitter), and transistor Q12 turns OFF. When the transistor Q11 turns ON, the electric potential of the negative pole of the capacitor C12 becomes nearly +Vp1, since the resistance between the collector and the emitter of the transistor Q11 is extremely small. The electric potential of the positive pole side of capacitor C12 becomes 2×(+Vp1). At this time, due to the fact that the electric potential of the positive pole side of capacitor C11 does not reach 2×(+Vp1), and diodes D13 and D12 have a reverse current prevention function, capacitor C12 begins to charge capacitor C11.

In conjunction with the charging of capacitor C11, the electric potential of the positive pole side of capacitor C12 attempts to drop. The electric potential of the positive pole side of capacitor C11 attempts to drop in conjunction with subsequent supply of the +Vp power supply. However, during that time, the OFF/ON of PF1 and PF4 (ON/OFF of PF2 and PF3), that is, the OFF/ON of transistor Q11 (ON/OFF transistor Q12), is repeated. Charging of both capacitors C12, C11 is performed instantaneously so the electric potential of the positive pole side of capacitor C11 is maintained at 2×(+Vp1).

Specifically, the junction of diode D12 and capacitor C11 is held constant at 2×(+Vp1), and a continuous stable output voltage (boost voltage) +Vp (2×(+Vp1)) is output as a +Vp power supply from the output end OUT. This +Vp power supply is supplied as the common direct current power supply for operation to gate circuit portions 32a and 32b of the pre-drive circuit 32 in FIG. 4.

Figure 2A:
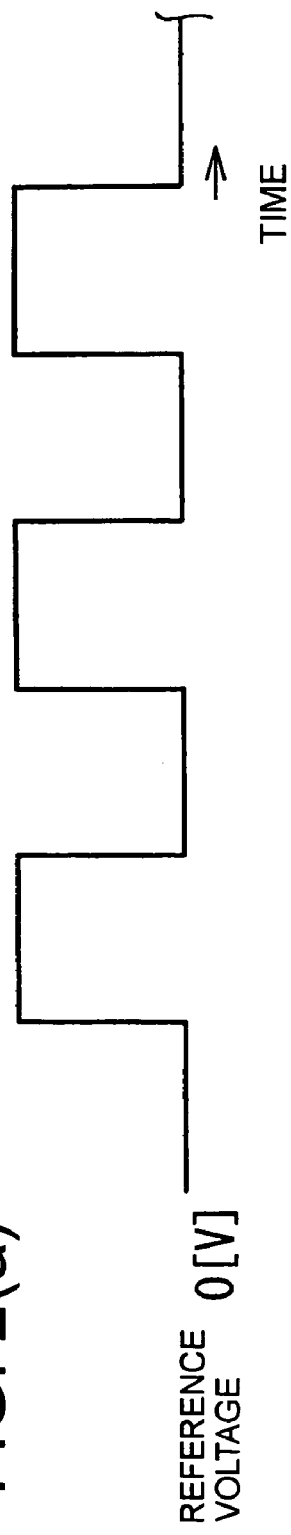
FIG. 2(a) is a voltage waveform diagram for illustrating the operation of gate signal GS1 in the circuit diagram of FIG. 1.
Figure 2B:
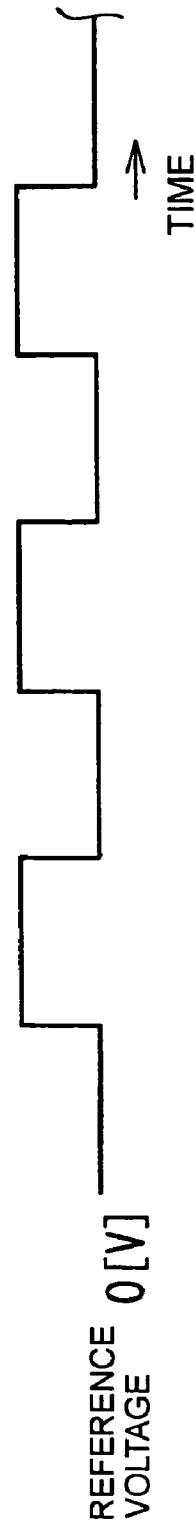
FIG. 2(b) is a waveform diagram for illustrating the operation of gate signal GS4 in the circuit diagram of FIG. 1.

FIG. 2(a) is a voltage waveform drawing of gate signal GS1 in FIG. 1. FIG. 2(b) is a voltage waveform drawing of gate signal GS4. The voltage waveforms of gate signal GS2 and gate signal GS3 are also the same as in FIGS. 2(a) and 2(b) with the exception of the phase differing. Note that FIGS. 2(a) and 2(b) present examples of the case in which the duty ratio is 100%.

As shown in the drawing, gate signal GS1 (GS2) is such that is possible to change the level until the voltage is higher than that of gate signal GS4 (GS3), and PF1 (PF2) ON/OFF control becomes possible. Moreover, since a continuous stable output voltage (boost voltage) +Vp [V] is output as the Vp power supply, operation of the motor is extremely stable without rounding occurring in the voltage waveform of gate signal GS1 (GS2) during rise and fall.

In addition, costs are not high and the space occupied is not large as in conventional circuits that use integrated circuits (ICs) and transformers. Packaging for a compact printed wiring board that is built into the motor can be performed easily by pursuing lower cost measures.

Referring back to FIG. 1, the parallel circuit of diode D11 and resistor R11 and the parallel circuit of diode D14 and resistor R13 are such that the time of the ON/OFF of transistors Q11 and Q12 are finely adjusted so that the ON durations and OFF durations of transistors Q11 and Q12 do not overlap. Specifically, diode D11 speeds up the OFF time with respect to transistor Q11, and resistor R11 delays the ON time. In addition, diode D14 speeds up the OFF time with respect to transistor Q12, and resistor R13 delays the ON time. As a result, it is possible to guard against the malfunction of transistors Q11 and Q12.

In addition, when a high voltage surge, or the like is input to the base of transistor Q11 and the base of transistor Q12, Zener diodes ZD11 and ZD12 absorb (voltage restriction) the surge and protect transistors Q11 and Q12.

Moreover, the filter RCF absorbs (removes) noise that is included in the boost voltage output.

Figure 3:
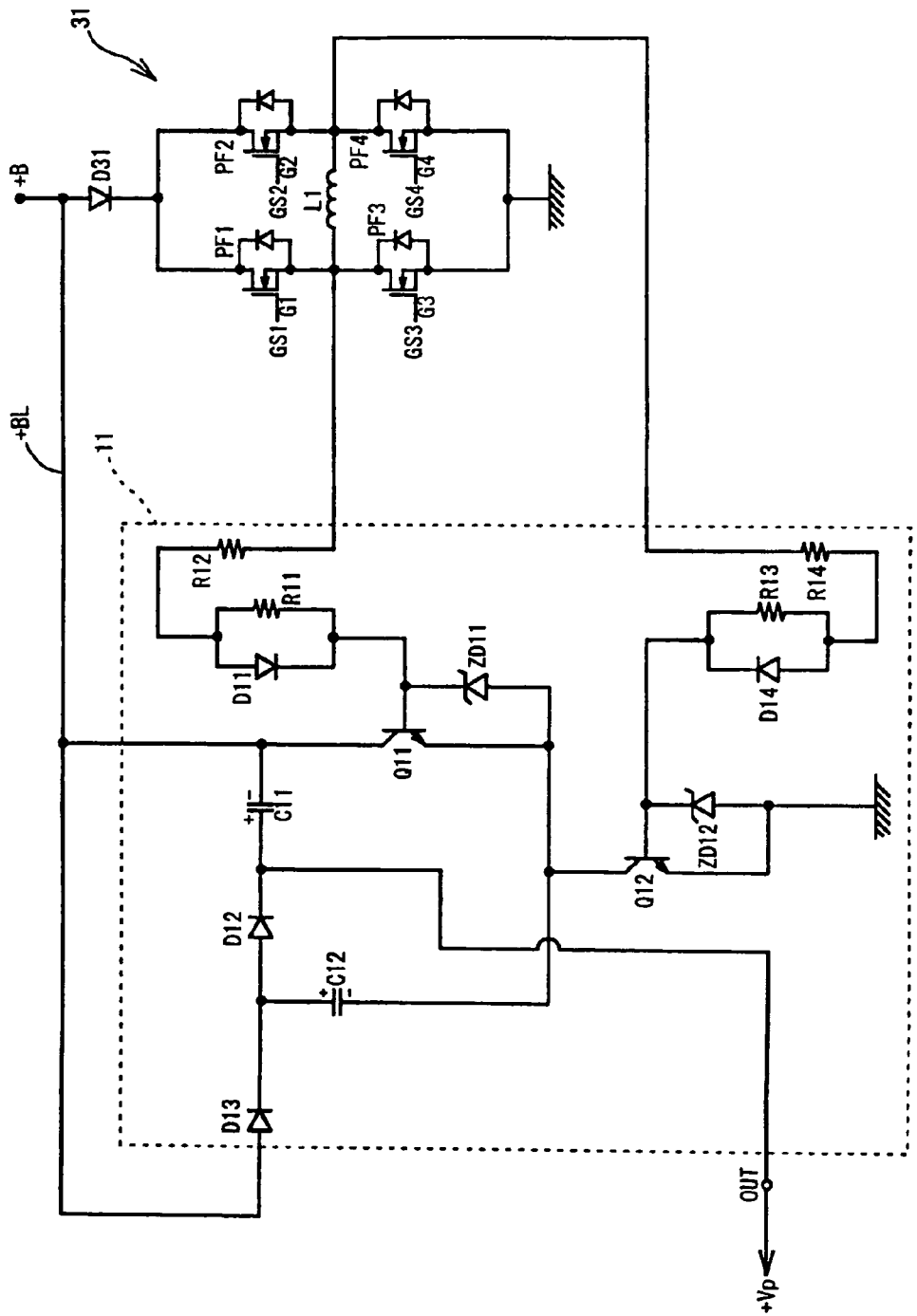
FIG. 3 is a circuit diagram according to a second embodiment of the present invention.

FIG. 3 is a circuit diagram according to a second embodiment of the present invention.

In this drawing, explaining portions that are identical to or correspond to those in FIG. 1 will be explained using the same codes, in this embodiment, the RC filter circuit RCF has been omitted from the circuit shown in FIG. 1.

In this drawing, portions that are identical to or correspond to those in FIG. 1 will be explained using the same reference numbers. In this embodiment, the RC filter circuit RCF has been omitted from the circuit shown in FIG. 1.

In the above embodiment, an N-channel MOS-type power FET was used in the main switching terminal, but it is not limited thereto, for example, a power transistor that connects the diodes back-to-back between the collector and emitter may be used.

In addition, an NPN-type transistor was used in the boost control switching element, but an element that has other switching functions may also be used.

As should now be appreciated, the above discussed booster circuit of a pre-drive circuit is formed using two main boost control switching elements having a respective Zener diode connected thereto to absorb (restrict voltage) the surge and protect the transistors that serve as the switching elements. Also, a diode-capacitor pair is provided for each switching element for reverse current protection. Further, a parallel circuit having a diode and two resistors is connected between each switching element and a junction of the motor coil and a series connection of a power FET pair. The boost voltage may be conducted through an optional RCF filter.

As should now be appreciated, the above discussed booster circuit of a pre-drive circuit is formed using two boost control switching elements having a respective Zener diode connected thereto to absorb (restrict voltage) the surge and protect the transistors that serve as the switching elements. Further, a parallel circuit having a diode and a resistor is connected between each switching element and a junction of the motor coil and a series connection of a power FET pair. The boost voltage may be conducted through an optional RCF filter.

What is claimed is:

1. A booster circuit for a pre-drive circuit that drives a drive circuit of a brushless direct current single-phase motor, wherein:

the drive circuit includes two pairs of serially connected main switching elements, each pair of the serially connected main switching elements being connected between a direct current power supply of the drive circuit and ground, and a motor coil interconnected between pair junctions of the serially connected main switching elements, the pre-drive circuit provides ON/OFF power flow control to the motor coil, and ON/OFF control of the respective main switching elements is prescribed at any timing from any direction, the booster circuit provides a control voltage that exceeds a power supply voltage to turn ON each of the two pairs of serially connected main switching elements of the drive circuit at the direct current power supply side, the booster circuit including a first boost control switching element that turns ON when a first end side of the motor coil reaches a higher electric potential than another end side of the motor coil and charges a first capacitor from the direct current power supply via a first diode, a second boost control switching element that turns ON when the another end side of the motor coil reaches a higher electric potential than the first end side of the motor coil and conducts electricity between a terminal at a side of a connection between the first boost control switching element and the first capacitor and the direct current power supply to increase the electric potential at a side of a junction of the first capacitor and the first diode, and a second capacitor that receives an electric charge and is charged from the first capacitor via a second diode when the second boost control switching element turns ON and is connected between said second diode and a switch terminal at the direct current power supply side of the second boost control switching element, and a boost voltage output is obtained from the connection path between the second diode and the second capacitor.

2. The booster circuit according to claim 1, further comprising parallel circuits of a diode and a resistor respectively inserted and connected between the first end side of the motor coil and a control terminal of the first boost control switching element and between the another end side of the motor coil and a control terminal of the second boost control switching element, wherein the diode faces the forward direction with respect to the control terminals of the respective boost control switching elements.

3. The booster circuit according to claim 1, wherein respective voltage restricting elements are connected between respective control terminals and ground side switch terminals of the first and second boost control switching elements.

4. The booster circuit according to claim 2, wherein respective voltage restricting elements are connected between the respective control terminals and ground side switch terminals of the first and second boost control switching elements.

5. The booster circuit according to claim 3, wherein the voltage restricting elements are Zener diodes.

6. The booster circuit according to claim 4, wherein the voltage restricting elements are Zener diodes.

7. The booster circuit according to claim 1, further comprising a filter circuit inserted into the boost voltage output path from the connection path between the second diode and the second capacitor.

8. The booster circuit according to claim 2, further comprising a filter circuit inserted into the boost voltage output path from the connection path between the second diode and the second capacitor.

9. The booster circuit according to claim 1, wherein the first boost control switching element is a first transistor and a base of the first transistor is connected at a junction of the main coil and a first pair of the serially connected main switching elements of the drive circuit via a first parallel diode-resistor circuit.

10. The booster circuit according to claim 9, further comprising a first Zener diode connected between the base and emitter of the first transistor.

11. The booster circuit according to claim 1, wherein the second boost control switching element is a second transistor and a base of the second transistor is connected at a junction of the main coil and a second pair of the serially connected main switching elements of the drive circuit via a second parallel diode-resistor circuit.

12. The booster circuit according to claim 11, further comprising a second Zener diode connected between the base and emitter of the second transistor.

13. A booster circuit configured to provide a boost voltage to a pre-drive circuit which controls the application of power to a motor coil associated with a brushless direct current single-phase motor, the motor coil coupled to a drive circuit including a direct current power supply and to ground, the booster circuit comprising:

a first boost control switching element coupled to a first side of the motor coil;

a second boost control switching element coupled to a second side of the motor coil and the first boost control switching element; and a first diode and a second diode coupled respectively to a first capacitor and a second capacitor and to the first boost control switching element and the second boost control switching element, wherein:

the first boost control switching element is configured to:

turn ON when a first voltage associated with the first side of the motor coil exceeds a second voltage associated with the second side of the motor coil, and charge the first capacitor from the direct current power supply via the first diode, the second boost control switching element is configured to:

turn ON when the second voltage associated with the second side of the motor coil exceeds the first voltage associated with the first side of the motor coil, and conduct from the first diode, the first capacitor, and the direct current power supply to increase the electric potential of a junction of the first capacitor and the first diode, to in turn cause the first capacitor to charge the second capacitor via the second diode, and a boost voltage is obtained from a node connecting the second diode and the second capacitor and is provided to the pre-drive circuit.

14. A booster circuit in accordance with claim 13, wherein:

the first boost control switching element and the second boost control switching element further comprise respective first and second switch terminals, first and second control terminals and first and second voltage restricting elements;

the first voltage restricting element is connected between the first switch terminal and the first control terminal: and the second voltage restricting element is connected between the second switch terminal and the second control terminal.

15. A booster circuit according to claim 14, wherein the respective first and second voltage restricting elements are respectively first and second Zener diodes each arranged in a forward direction towards the respective first and second control terminals of the respective first and second boost control switching elements.

16. A booster circuit according to claim 13, further comprising a filter circuit coupled to the node connecting the second diode and the second capacitor for reducing noise associated with the boost voltage.

* * * * *